United States Patent
Wehmeyer

(10) Patent No.: US 6,226,235 B1
(45) Date of Patent: May 1, 2001

(54) APPARATUS AND METHOD FOR IDENTIFYING THE INFORMATION STORED ON A MEDIUM

(75) Inventor: Keith Reynolds Wehmeyer, Fishers, IN (US)

(73) Assignee: Thomson Licensing S.A., Goulogne (FR)

(*) Notice: Subject to any disclaimer, the term of this patent is extended or adjusted under 35 U.S.C. 154(b) by 0 days.

(21) Appl. No.: 09/470,711

(22) Filed: Dec. 23, 1999

Related U.S. Application Data

(62) Division of application No. 08/760,529, filed on Dec. 2, 1996, now Pat. No. 6,034,925.

(51) Int. Cl.⁷ .................................................. G11B 17/22
(52) U.S. Cl. ................................... 369/30; 700/234
(58) Field of Search ................................. 369/30, 33, 34, 369/47, 48, 58; 700/234, 235, 231

(56) References Cited

U.S. PATENT DOCUMENTS

| | | | |
|---|---|---|---|
| 4,899,326 | * 2/1990 | Takeya et al. | 369/36 |
| 5,341,350 | * 8/1994 | Frank et al. | 369/30 |
| 5,355,302 | * 10/1994 | Martin et al. | 364/410 |
| 5,568,455 | * 10/1996 | Balsom | 369/30 |
| 5,691,964 | * 11/1997 | Niederlein et al. | 369/30 |
| 5,751,672 | * 5/1998 | Yankowski | 369/30 |
| 5,781,889 | * 7/1998 | Martin et al. | 705/1 |
| 5,883,864 | * 3/1999 | Saliba | 369/30 |
| 5,959,945 | * 9/1999 | Kleiman | 369/30 |

* cited by examiner

*Primary Examiner*—Tan Dinh
(74) *Attorney, Agent, or Firm*—Joseph S. Tripoli; Robert D. Shedd; Frank Y. Liao

(57) ABSTRACT

A media player reads program information from a media. A controller is used for deriving therefrom media characterization information and for receiving media identification information and media classification information from an external data base in response to the media characterization information. The controller couples one of alphanumeric and graphical information signals representing the media identification information and the media characterization information to a display device.

9 Claims, 4 Drawing Sheets

APPARATUS AND METHOD FOR IDENTIFYING THE INFORMATION STORED ON A MEDIUM

CROSS-REFERENCE TO RELATED APPLICATIONS

This application is a divisional of Application No. 08/760, 529, filed on Dec. 2, 1996, and now issued as U.S. Pat. No. 6,034,925; and which is related to Application No. 08/759, 319, filed on Dec. 2, 1996, and now issued as U.S. Pat. No. 6,031,795.

FIELD OF THE INVENTION

This invention relates to prerecorded media generally and particularly to a technique for determining or verifying media content.

BACKGROUND OF THE INVENTION

Some prerecorded media, such as CD-ROMs and the various DVD formats, contain descriptive information (e.g., title, # of racks, length) about the program(s) recorded on the media. This descriptive information allows a user to more accurately control the playing or reproduction of programs recorded on the media. Unfortunately, some prerecorded media, such as audio CDs or LaserDisks, do not include such descriptive information.

If a user wishes to incorporate content-descriptive information from, e.g., audio CDs or LaserDisks, then the data may be manually entered. For example, computer programs are known which utilize a computer's CD-ROM reader to identify the number of tracks and length of each track of an audio CD and store this information on a hard disk. Disadvantageously, a user must then manually type in the title and song names of the audio CD. The title and song names are then stored.

Therefore, it is seen as desirable to derive descriptive information relating to media content without requiring user intervention. It is also desirable to provide such content-descriptive data in a form which may be readily displayed on-screen.

SUMMARY OF THE INVENTION

The present invention is in part based on the recognition that the physical or logical arrangement of data stored on a medium may be used to identify the stored data and retrieve descriptive information relating to the stored data.

In one embodiment of the invention a controller and media-reader are used to identify various physical or logical characteristics of data stored on a pre-recorded medium. These characteristics may include, e.g., the kind of medium, the kind of data, the way the data is segmented or separated, the size of any data segments, the total amount of data or physical size of the medium carrying the data. A controller then compares the identified set of characteristics to stored sets of characteristics which are associated with respective content-identifiers (i.e., information content indicia). A successful comparison yields content-identifiers applicable to the data stored on the pre-recorded medium. These content identifiers may be, e.g., information identifying the titles and length of audio or video programs included on the media.

In another embodiment of the invention a computer including a CD-ROM reader determines the number of tracks and play time for each track of an audio CD, compares this information to information stored in a database and identifies the audio CD. The identity of the audio CD is then used to retrieve content-descriptive information about the audio CD.

In still another embodiment of the invention content-descriptive information is derived and used to identify and catalog a plurality of, e.g., audio or video disks contained in an audio or video "jukebox" arrangement. The catalog data may then be incorporated into an on-screen selection guide.

Another embodiment of the invention comprises a method for reducing the impact of media inconsistencies upon the operation of the invention by weighting the various physical or logical characteristics of the media.

BRIEF DESCRIPTION OF THE DRAWINGS

The invention will be described with reference to the accompanying Drawing, in which.

Like reference designators in the various FIGURES refer to the same or similar elements.

DETAILED DESCRIPTION

Figure 1:
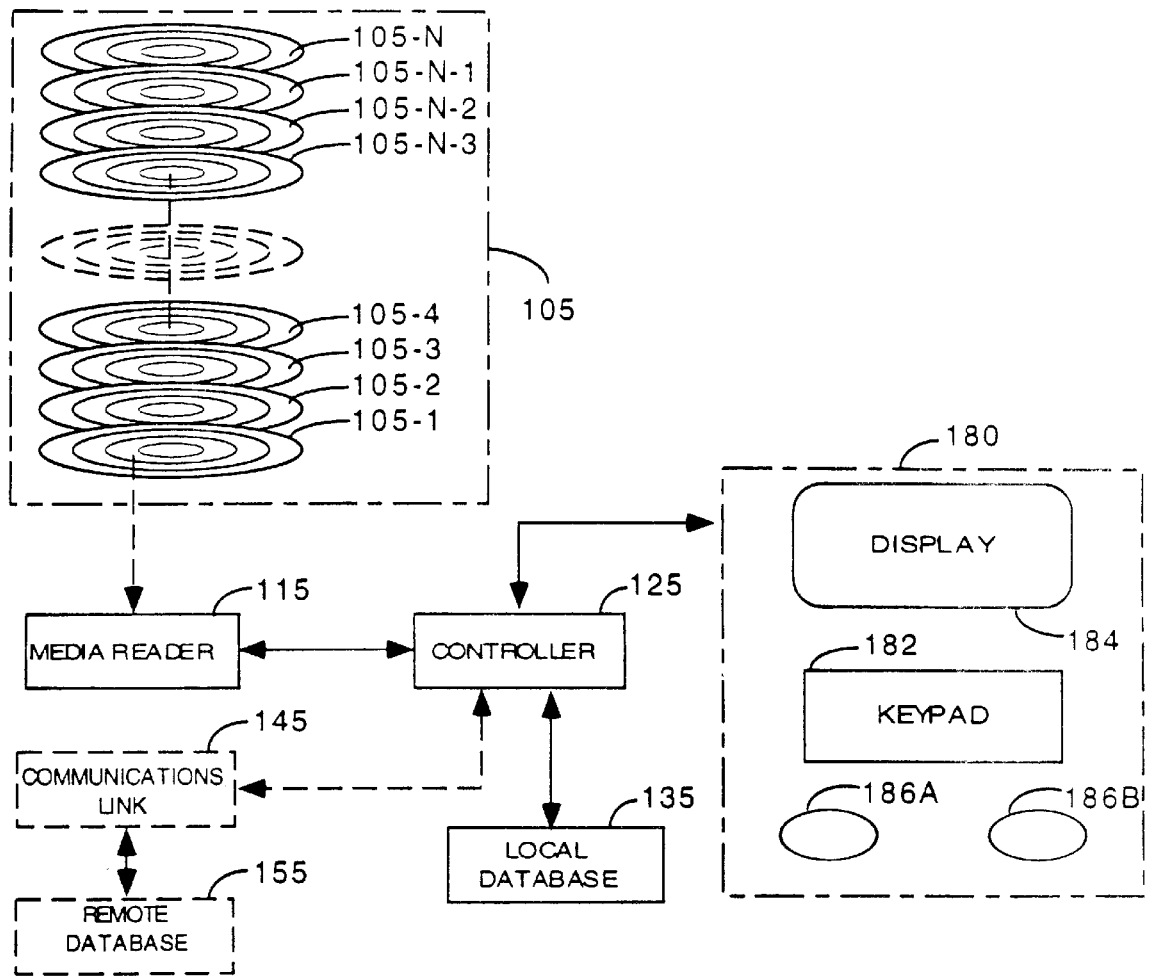
FIG. 1 shows a block diagram of a compact disk jukebox system according to the invention.

Some pre-recorded media, such as CD-ROMs and the various DVD formats, contain descriptive information (e.g., title, length) about the program(s) recorded on the media. This descriptive information allows a user to more accurately control the recording or reproduction of programs recorded on the media. In addition, the descriptive information enables the user to easily identify the contents of pre-recorded media. This ease of identification allows easy cataloging of the user's media collection and quick access to desired programs contained within the collection. Unfortunately, some pre-recorded media, such as audio CDs or LaserDisks, do not include such descriptive information. As such, if a user wishes to enjoy the above-described advantages then the user must manually catalog the media collection.

The inventor recognizes that the physical or logical arrangement of data stored on a medium is useful in identifying the content (i.e., video program, audio program, computer software. etc.) of the medium. A relatively unique profile of the physical and/or logical characteristics of the data stored on a medium may be determined by examining the medium containing the program data. The determined profile may then be compared to profiles stored, for example, in a database. These stored profiles are linked to, or associated with, descriptive information about program content, source, etc.. Thus, by matching the determined profile to a stored profile the user may retrieve descriptive information (i.e., information content indicia) about the program(s) recorded on his or her medium.

By advantageously including a sufficient number of characteristics the profile of data stored on a particular medium becomes relatively unique. The characteristics of the stored data may include, illustratively, format, total amount, logical segmentation (if any), segment amount, data samples at, e.g., segmentation boundaries, and other criteria. For example, a profile of the physical and/or logical characteristics of a first audio compact disk (CD) containing a musical recording is likely to be different than the profile of a second audio CD containing a different recording. The inventor has determined that a relatively unique profile of an audio compact disk may be created using only the number of tracks (N) and the length (L) of each track. The profile may be made more unique by including other characteristics, such as the first or last few bytes of each track, data samples of predetermined portions of the disk or the total length of all tracks.

The "uniqueness" of the profile increases as the number of characteristics used in the profile are increased. However, even if there are several profiles which match the "relatively unique" profile the user may simply select which of the several profiles he believes is correct or allow the several profiles to be retrieved. The user may also compare additional characteristics of the profiled CD to the several profiles to ensure a match. This additional profiling procedure may be automated and only called upon as necessary, thus saving memory and time.

FIG. 1 shows a block diagram of a compact disk jukebox system according to the invention. The jukebox system 100 includes an input/output (I/O) unit 180 comprising a display 184, keypad 182 and speakers 186A, 186B. The I/O unit 180 is coupled to, and controlled by, a controller 125. The controller generates the on-screen display (OSD) signals needed for displaying selection information, user prompts and other information on the display 184. The controller 125 receives and responds to user commands entered via the keypad 182. I/O unit 180 includes audio processing circuitry (not shown) which receives audio information from the controller 125, processes the information and couples the processed audio information to the speakers 186A, 186B.

A media "stack" 105 includes one or more media 105-1 through 105-N storing audio, video or other program information. The media stack is coupled to a media reader 115 which is capable of selecting any medium within the stack and reading the stored program information stored onto the medium. The media reader is controlled by controller 125. As previously discussed, the program information is stored on the media 105 according to various physical and logical characteristics. In the case of an audio CD, the program information may be characterized according to the number of tracks (songs) and the length of each track (run time). Additional characterizing features may include, e.g., the first few bytes of each track, the last few bytes of each track, data samples of predetermined portions of the media or the total length of all tracks. These characteristics are determined in a known manner by, e.g., reading the disk.

Controller 125 is coupled to a local database 135 and to supporting memory and processing elements (not shown). As used herein, the term "controller" is intended to be interpreted to include the terms "computer," "microprocessor," "micro-controller" and the like. The local database 135 is used for storing a plurality of profiles and associated descriptive information. One of the plurality of profiles may match a profile of program information be stored on the media 105.

In the embodiment of FIG. 1, jukebox 100 is an audio jukebox and media stack 105 comprises a plurality of audio CDs. Each of the characteristic profiles stored in local database 135 includes a "number of tracks" characteristic and a "track length" characteristic for each track. Each of the characteristic profiles is associated with descriptive information including the Title of the CD and the name of the song associated with each track. A database suitable for use as local database 135 may be formed by, e.g., relating at least the following data fields: NUMBER OF TRACKS (N), LENGTH OF EACH TRACK (L(1)–L(N)) and DISK TITLE (DT). The database may be augmented by including additional descriptive information fields, such as: DISK ARTIST (DA) or TRACK ARTISTS (TA(1)–TA(N)) and TRACK NAME (TN(1)–TN(N)).

An optional remote database 155 may be accessed by the controller 125 via an optional communications link 145. The remote database may be, e.g., a commercial database such as that owned by the Muze® Corporation. The Muze® database is presently used as part of a music and video title lookup service. This service is accessed via a computer located, e.g., in retail music stores. A user of the computer enters some information relating to a desired music or video selection, e.g., partial title or artist name. The computer finds the music or video title(s) corresponding to the information entered by the user.

The communications link 145 may comprise, e.g., a modem which connects to the remote database 155 via an Internet or direct-dial connection. The remote database 155 may comprise raw profile data which may be downloaded by the controller and stored in the local database. In this case the raw data may need to be converted into a form which is suitable for comparison to the determined profile. For example, the raw profile data may include more (or less) characteristics than necessary or simply different characteristics.

The remote database 155 may also include remote processing means for implementing a retrieve capability. In this case the controller 125 would upload the determined profile to the remote database 155. The remote processing means would then convert the profile to a suitable form (if necessary) and compare the uploaded profile to profiles stored in the remote database 155. Upon finding a match the controller 125 would download the descriptive information related to the program(s) store on the medium 105.

To transact with a remote database provider or owner it is likely that an account or some other method of authorization will be necessary. If the remote database provider transacts for a fee then the subscriber will need to transmit at least identification information along with the profile information when accessing the remote database. The transaction process may be entirely automated. For example, controller 125 may contact the provider of the remote database 155 via an Internet or direct-dial communications link 145. Upon successfully connecting to the provider an identification or authorization code is transmitted to the provider. The identification or authorization code may be encrypted using, e.g., a public key encryption scheme such as the "pretty good privacy" (PGP) scheme. After verifying the identification or authorization code the provider will allow the controller 125 to upload profile data. The remote database provider will then find and download the descriptive information to the controller 125. The remote database provider may devote some data space to each authorized user so that duplicate requests may be handled more expeditiously, possibly at a reduced rate.

Figure 3:
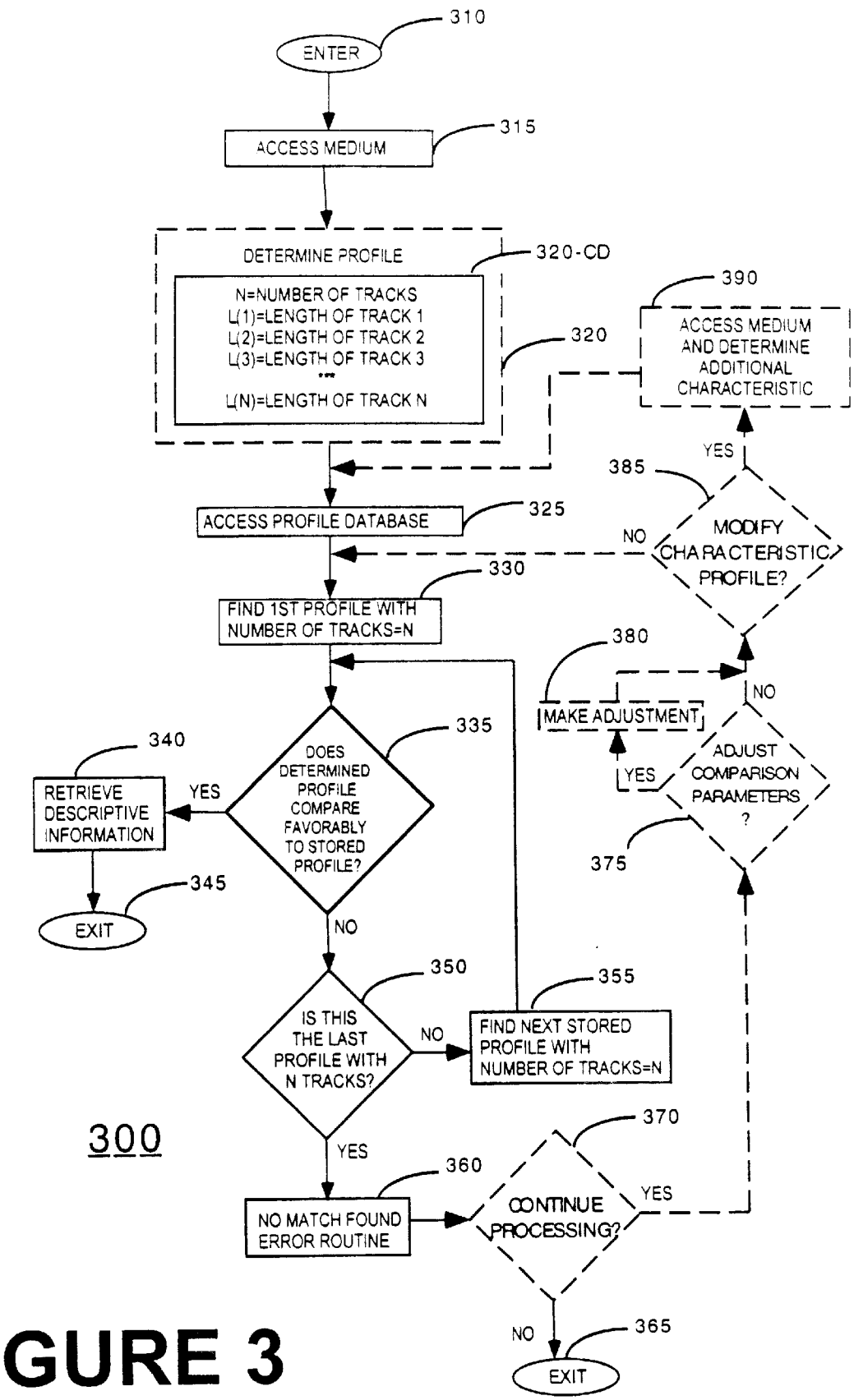
FIGS. 3 and 4 are flow charts useful in understanding the invention.

The flow chart of FIG. 3 shows a method 300 for obtaining descriptive information relating to an unidentified CD which is suitable for use by the controller 125 of jukebox 100. The method may also be utilized by the provider of a remote database for processing uploaded profile data. The retrieval routine. 300 is entered at step 310. The medium 105 is accessed (step 315) by the media reader 115 and a profile 320-CD of the medium is determined (step 320). In this case the profile includes the number of tracks (N) on an audio CD and the length of each track (L(1) through L(N)). After determining the profile, the controller accesses (step 325) a profile database (135 or 155). The controller finds (step 330) the first profile in the database of a disk having N tracks. The controller then compares (step 335) the length of each of the N tracks of the determined and found profiles. If the track lengths of the profiles compare favorably (tracks lengths are the same or within a predetermined error margin, e.g., 2 seconds) then the descriptive information relating to the audio CD matching the profile is retrieved (step 340) and the routine is exited (step 345). If the track lengths do not compare favorably then the controller determines (step 350) if the found profile is the last profile in the database of a disk having N tracks. If the found profile is the last profile then an error routine (step 360) may be initiated and the routine exited (step 370). If the found profile is not the last profile then the next profile is found (step 355) and the process (steps 335 to 350) is repeated.

The error routine (step 360) may comprise, e.g., returning an error message, prompting the user for a response (e.g., "Continue search?" "Add new parameters?") or automatically adjusting the search parameters. If the search is to be terminated (i.e., no further processing of the profile data) then the routine is exited at step 365. The error routine (360) may prompt the user for appropriate error margin data or automatically determine an appropriate adjustment amount for the predetermined error margin data used in the comparison step (335). The predetermined error margin mentioned above may be, e.g., a window function. In the above embodiment the window in which a favorable match occurs is plus or minus 2 seconds of an exact match. The window may be increased to e.g., 4 seconds.

After error processing (360) it may be appropriate to perform additional processing steps (370–390). The optional steps indicated in shadow (370–390) exemplify such steps. In the exemplary embodiment, if continued processing is appropriate (step 370) then the controller determines of any of the comparison parameters (e.g., window functions, tolerances, etc.) are to be adjusted (step 375) and, if appropriate, makes the adjustment (step 380). The controller next determines (step 385) if the characteristic profile should be modified by, e.g., adding characteristics (e.g., track or disk data samples, etc.) to increase (e.g., too many matches) or decrease (e.g., no match found) the uniqueness of the determined profile. If the profile is not to be modified then the search of the accessed database is reinitiated at step 330 with the any new comparison parameters. If the profile is to be modified then the medium is accessed (step 390) and any additional characteristics are determined and incorporated into the profile database. Thereupon the profile database is accessed (step 325) and the search continues.

It should be noted that after determining the profile 320-CD, controller 125 accesses (step 325) either a local (135) or, optionally, a remote (155) profile database. As a practical matter, the local database would be accessed first and, if the local database did not contain a matching profile, the optional remote database could be accessed. As previously described, the remote database 155 may also include remote processing means for implementing a retrieve capability. This retrieve capability may be implemented by a number of methods, including the method 300 of FIG. 3.

Figure 4:
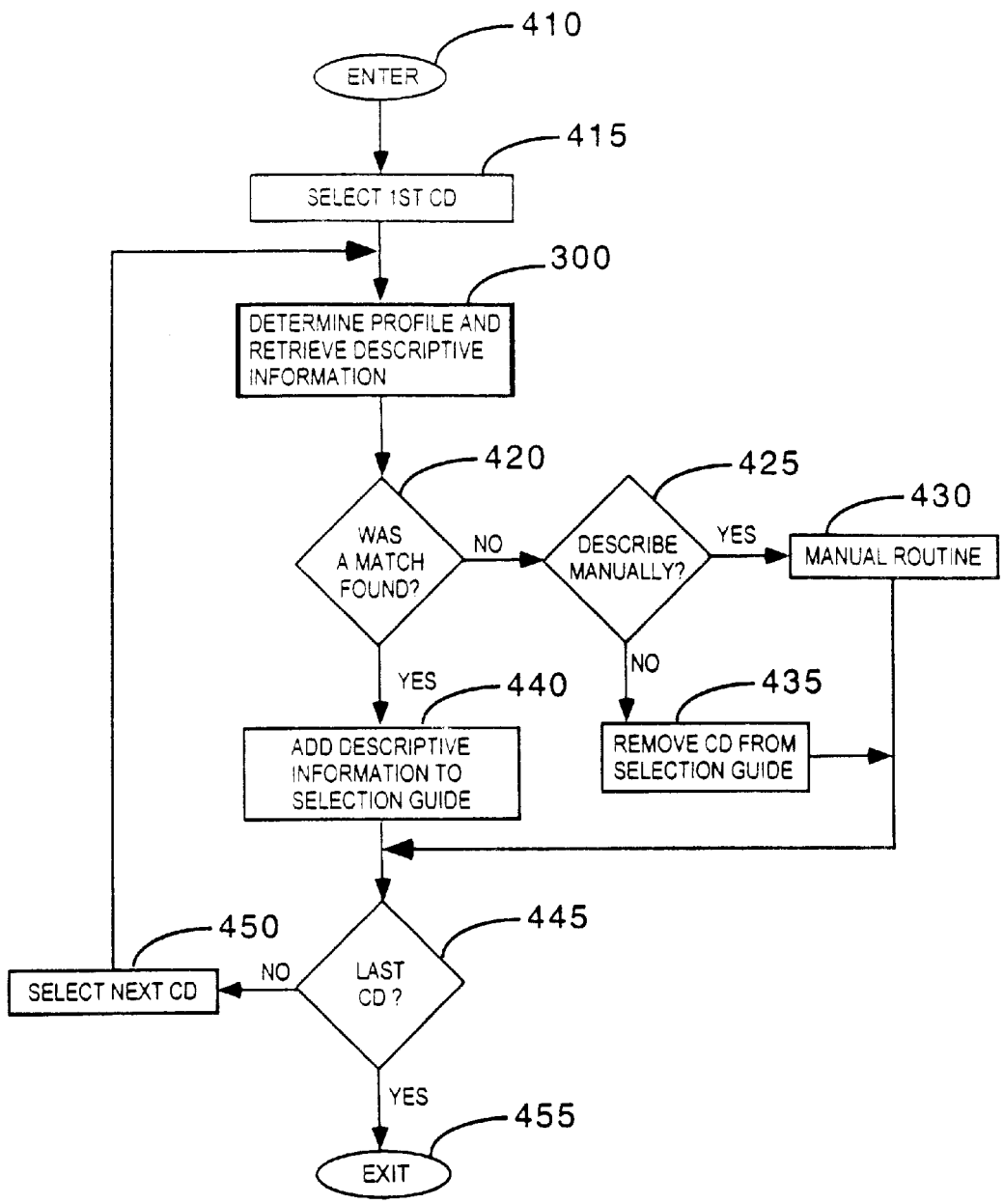

FIG. 4 shows a flowchart of an "auto-programming" method suitable for use by the jukebox 100 of FIG. 1. The above-described method 300 for obtaining descriptive information relating to an unidentified medium may be incorporated into the autoprogramming method 400 FIG. 4. A jukebox autoprogramming process entails the construction of a selection information database containing . The selection information database contains the raw information which is processed by the controller 125 and communicated to the user as a selection guide by display 184. The user responds to the displayed information by selecting, via the keypad 182, one or more disks or tracks for listening. The method 400 may be used in an "auto-program" mode in which descriptive information relating to the various CDs is obtained and added to the selection guide. CDs which do not have associated descriptive information may be removed from the selection guide. The construction method optionally allows manual intervention (i.e., typing of the descriptive information) in the case of CDs having unmatched profiles. The above-described method and apparatus is useful for, e.g., automatically identifying and describing new CDs and reconstructing the selection information database of a selection guide.

The database construction routine 400 is entered at step 410. The controller 125 directs the media reader 115 to select (step 415) a first CD from the media stack 105. The profile of the selected CD is determined and any descriptive information is retrieved by, e.g., the determination method 300 of FIG. 3. If the determination method (step 300) is able to provide descriptive information about the selected CD (i.e., a match was found in step 420), then the descriptive information is added (step 440) to the selection information database. If a match is not found then an opportunity to manually describe (step 425) the CD exists. If CD is not to be manually described then information about the CD is removed (step 435) from the selection information database. If CD is to be manually described then the manual description routine (step 430) is entered. Such a routine may comprise, e.g., the previously described prior art method of inserting the CD in a computer CD-ROM drive and manually entering title and track information.

After processing (steps 300–440) the selected CD the controller determines (step 445) if there are any CDs remaining to be processed. If the processed CD was the last CD then the database construction (i.e., autoprogramming) routine is exited at step 455. If there are more CDs to be processed then the controller directs the media reader 115 to select (step 450) the next CD and the processing steps 300–440 are repeated. This method 400 may be used, advantageously, to automatically create an accurate database of, e.g., all the CDs in a jukebox 100. Such a database may then be manipulated using any of a variety of known techniques (e.g., searched or sorted) to enable precise user control of program selections.

A jukebox 100 utilizing the above-described methods and techniques offers an improved level of service to the user when compared to existing jukeboxes. For example, existing jukeboxes, such as those found in a commercial or public establishments, typically require a specific, physical layout of the CDs. That is, each CD is physically inserted into a particular slot such that the cover art and index from the CDs are visible to the user. Since all the CDs cannot be viewed at one time they are usually mounted on some type of carrousel. The user browses the available selections by sequentially viewing the slotted CDs through a clear panel. The user makes a selection by pressing a button or buttons corresponding to both the slot and track numbers. This system disadvantageously lacks any searching ability. Moreover, the display method is cumbersome and the selection method is prone to errors (e.g., selecting track 15 of a disk having 14 tracks) which require additional setup parameters. In contrast to existing jukeboxes, the owner of a jukebox 100 utilizing the invention simply adds CDs to the media stack as they arrive. The controller 125 can be programmed to take care of all the descriptive details as previously described. A user may be provided with, for example, a sorted list (e.g., alphabetical by artist or track) or a grouped list (e.g., type or category of music such as classical, rap, jazz, rock:light, rock:alternative). The grouped list information may help a user navigate through the jukebox selections by allowing more direct selection requests (e.g., "play some classical music," "play 15 minutes of jazz followed by 10 minutes of alternative rock" or "play a random selection of jazz, rock, and classical but not rap").

Variations in audio and compact disks can occur due to manufacturing tolerances. Compact disks are typically manufactured in batches, or "pressings" of a certain numeric level depending on, e.g., anticipated sales or existing orders. As such, the same disk (i.e., same album or program released by an artist) may be pressed several times in the same or different factories. A disk manufactured in one pressing may not be identical to a disk manufactured in a different pressing or manufactured in a different factory. For example, the inventor has observed differences of several seconds on the same track of two disks which are ostensibly the same. Another cause of variations between disks is the purposeful modification of a disk to meet the demands of retailers. For example, some large retailers (e.g., WalMart Department Stores and Blockbuster Video Stores) will not sell products which contain certain lyrics or images which are deemed inappropriate for their clientele. In response, producers of audio and video programs manufacture special disks for these retailers with, e.g., portions of the audio or video muted or removed. These modifications change, e.g., track length, the actual data stored on the track, a checksum of the data, etc. In some cases an entire song may be deleted from the disk.

To allow for the above variations the method 300 for obtaining descriptive information shown in FIG. 3 may be enhanced. For example, a characteristic profile may simply include more characteristic information, such as the first or last few bytes of each track or data samples at predetermined portions of the disk. Given a sufficient number of characteristics a more detailed profile may be constructed. With a more detailed profile the matching process may be conducted in a more accurate manner, though possibly with a performance penalty (e.g., more processor time).

The method 300 for obtaining descriptive information may also be enhanced by assigning different weighting factors to the various characteristic information components which define a profile. A characteristic such as the number of tracks would ordinarily be assigned a higher weighting factor than a characteristic such as the length of a particular track. A distance equation approach (i.e., summing all the characteristic*weighting factor results) may be utilized for profile comparisons. In this manner minor variations between disk pressings (e.g., length of a track) may be compensated for.

The method 300 for obtaining descriptive information may also be enhanced by constructing multiple profiles and performing multiple profile matches. For example, three profiles may be constructed such that the removal of an entire track from a disk would only cause a match failure of one of the three profiles. If two of the three profiles are successfully matched then the enhanced routine of FIG. 3 would return the appropriate descriptive information.

Figure 2:
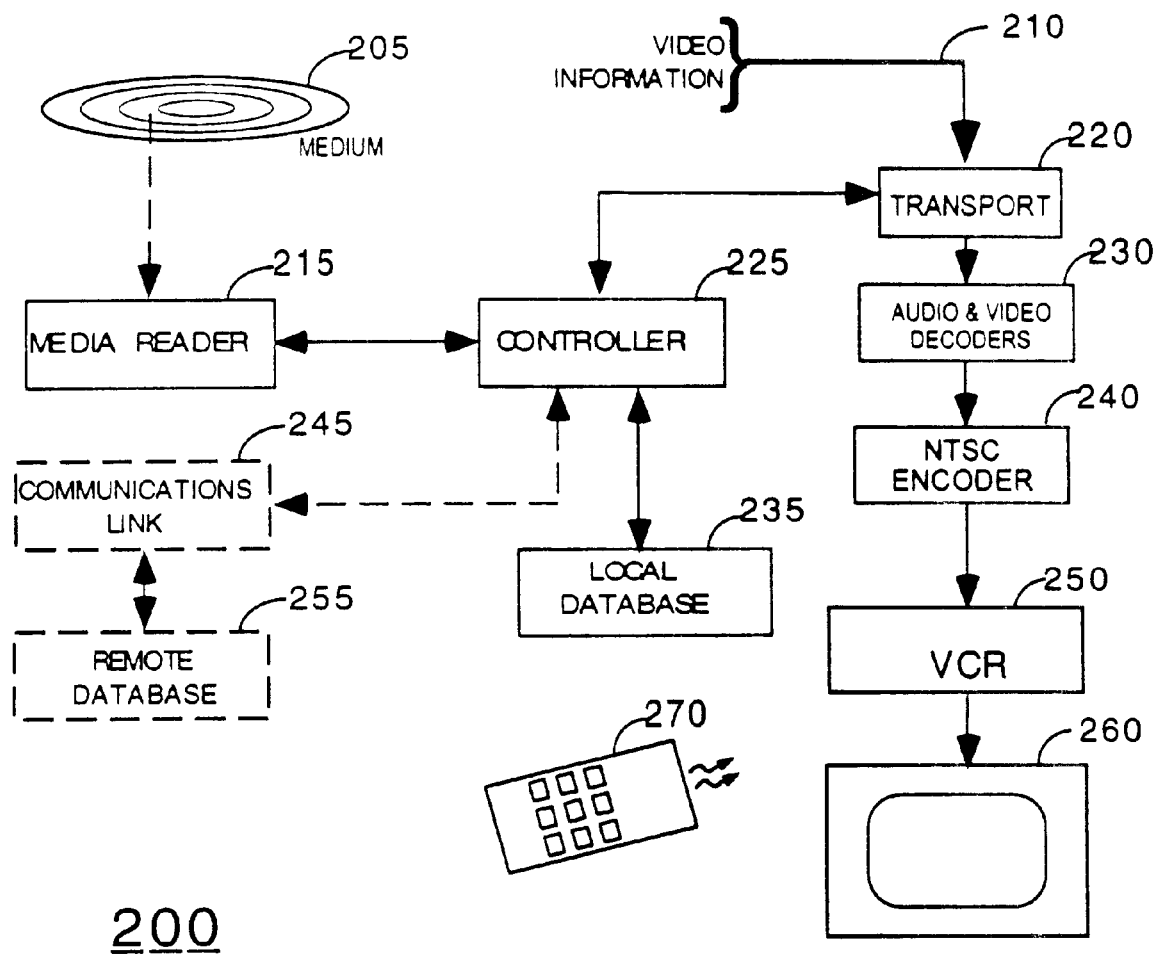
FIG. 2 shows a block diagram of a television system according to the invention.

It is important to note that a media stack similar to the media stack 105 of jukebox 100 may be incorporated into the television system 200 of FIG. 2. FIG. 2 shows a block diagram of a television system according to the invention. The television system 200 receives a video signal 210, e.g., a demodulated and forward error corrected RCA® DSS® satellite system data stream. The received data stream 210 is coupled to a transport unit 220 which transports the data stream 210 to an audio and video decoder unit 230. An NTSC encoder unit 240 receives decoded audio and video information from decoder unit 230 and encodes the information into e.g., an NTSC composite video signal. The NTSC signal is then coupled to a display means 260 via, e.g., a VCR 250.

A controller 225, including an infrared (IR) receiver, is responsive to commands transmitted to the controller via an IR transmitter unit 270. The controller 225 generates on-screen display (OSD) signals which are useful for displaying the various operational and programming options available to a user. Transport unit 220, which is responsive to the controller 225, receives the OSD signals from the controller 225 and inserts the OSD signals into the data stream to be displayed. The user of the television system 200 may transmit commands to the controller 225 by pressing various keys on remote control unit 270. The user may be make decisions utilizing an on-screen selection guide produced by the OSD signals.

A media reader 215 capable of reading program information stored on a medium 205 is controlled by the controller 225. As previously discussed, the stored program information is arranged on the medium according to various physical and logical characteristics and may comprise, e.g., audio or video programs. As previously mentioned, a media stack similar to the media stack 105 of jukebox 100 may be incorporated into the television system 200 of FIG. 2.

Controller 225 is coupled to a local database 235 and to supporting memory and processing elements (not shown). The local database 235 is used for storing a plurality of profiles and associated descriptive information. One of the plurality of profiles may match a profile of program information be stored on the media 105. The descriptive information may be obtained using a method similar to that presented in FIG. 3 and described above with respect to the jukebox 100.

A database suitable for use as local database 235 may be formed in a manner similar to that of the local database 135 used by jukebox 100 of FIG. 1. The local database 235 may be augmented further by including video-specific or LaserDisk-specific information, such color sampling, Hi-Fi audio encoding or surround sound samples, category / sub-category descriptions, program descriptions, etc. An optional remote database 255 may be accessed by the controller 225 via an optional communications link 245 as previously described with respect to the remote database 155 accessed by the jukebox 100 of FIG. 1. The remote database 255 may also include video-specific or LaserDisk-specific information. The remote database 255 may also include profile processing means as previously described.

It is important to note that the local database 235 may be used as an on-screen program selector database. In this case, the local database 235 is utilized by the controller 225 as a raw data source for the on-screen display of selection information. The controller 225 processes the raw data to form the desired OSD signals, which are then sent to transport unit 220 for insertion into the data stream to be displayed.

While it is entirely possible to simply display the raw data as text, graphics-oriented technology provides a more pleasing visual representation of the data. Thus, the controller 225 constructs objects and links these objects to the raw data. An object is simply a representation of information, possibly a graphical representation such as the familiar icons used in the Apple® Macintosh® or Microsoft® Windows® graphical user interfaces. In this case the represented information is a television program to be broadcast in the future or a video or audio program stored on a local medium (e.g., audio CD, LaserDisk, DAT, etc.) which is accessed via a local media player. The controller 225 causes the objects to be sent to transport unit 220 for display. The viewer selects a program from the on-screen display for immediate or future viewing or recording by manipulating respective objects within the on-screen display using, e.g., cursor keys on a remote control device.

It will be apparent to those skilled in the art, that although the invention has been described in terms of specific examples, modifications and changes may be made to the disclosed embodiments without departing from the essence of the invention. For example, while the invention has been described primarily with respect to audio compact disks, it may be practiced with any pre-recorded media, such as LaserDisks, digital audio tape (DAT), video tape, etc.. The inventive method advantageously procures content-descriptive information applicable to the data stored on any pre-recorded medium as long as the descriptive information exists in an accessible database.

It should also be noted that the video data stream 210 of television system 200 may be any type of video signal (e.g., NTSC, PAL, SECAM, HDTV, etc.). A digital data stream is disclosed in the exemplary embodiment; however, a digital data stream is not necessary to the practice of the invention.

What is claimed is:

1. A media identification and classification system, comprising:

a media player for reading media information from a media;

control means for deriving information characterizing said media read by said media player and communicating said media characterization information to an external data base via a communications link; and said control means being adapted to received media identification information and media classification information from said external data base derived automatically in response to said media characterization information and for providing at least one of alphanumeric and graphical information signal representing at least one of said media identification information a nd said media classification information to a display device.

2. The system of claim 1, wherein said communications link comprises a modem.

3. The system of claim 1, wherein said external database is coupled to said communications link via internet.

4. The system of claim 1, wherein said media player is one of an audio and a video media jukebox.

5. The system of claim 1, wherein a media is grouped based on said media classification information.

6. The system of claim 1 wherein said media classification information corresponds to at least one of type and category of music.

7. The system of claim 1, wherein a user may select a group of medium based on the media classification information.

8. The system of claim 1, wherein a plurality of medium are grouped based on said media identification and classification information.

9. The system of claim 1 wherein the at least one of the media identification and classification information is not recorded on the media.

* * * * *